US008043396B2

(12) United States Patent
Pessana

(10) Patent No.: US 8,043,396 B2
(45) Date of Patent: Oct. 25, 2011

(54) INTEGRATED PLASTIC LINER FOR PROPELLANT TANKS FOR MICRO G CONDITIONS

(75) Inventor: Mario Pessana, Rome (IT)

(73) Assignee: Finmeccanica SpA, Rome (IT)

( * ) Notice: Subject to any disclaimer, the term of this patent is extended or adjusted under 35 U.S.C. 154(b) by 123 days.

(21) Appl. No.: 11/721,974

(22) PCT Filed: Jun. 28, 2006

(86) PCT No.: PCT/IT2006/000500
§ 371 (c)(1),
(2), (4) Date: Jul. 24, 2009

(87) PCT Pub. No.: WO2007/004248
PCT Pub. Date: Jan. 11, 2007

(65) Prior Publication Data

US 2009/0302045 A1 Dec. 10, 2009

(30) Foreign Application Priority Data

Jun. 30, 2005 (IT) ............................. RM2005A0347

(51) Int. Cl.
*B01D 47/00* (2006.01)

(52) U.S. Cl. ............ 55/426; 55/424; 220/586; 220/745; 222/377; 206/0.6; 96/220; 96/186; 96/155; 244/135 R

(58) Field of Classification Search .................... 55/426, 55/424; 220/586, 745; 222/377; 206/0.6; 96/220, 186, 155; 244/135 R, 172
See application file for complete search history.

(56) References Cited

U.S. PATENT DOCUMENTS

| | | | |
|---|---|---|---|
| 3,321,159 A * | 5/1967 | Jackson | 244/135 R |
| 3,526,580 A * | 9/1970 | Taylor et al. | 205/50 |
| 3,534,765 A * | 10/1970 | Seiji et al. | 137/341 |
| 3,854,905 A * | 12/1974 | Balzer et al. | 96/220 |
| 3,945,539 A * | 3/1976 | Sossong | 222/386.5 |
| 4,272,257 A * | 6/1981 | Ellion et al. | 95/243 |
| 4,733,531 A * | 3/1988 | Grove | 60/259 |
| 4,743,278 A * | 5/1988 | Yeh | 96/220 |
| 4,898,030 A * | 2/1990 | Yeh | 73/290 V |
| 4,901,762 A * | 2/1990 | Miller et al. | 137/574 |
| 5,279,323 A * | 1/1994 | Grove et al. | 137/154 |
| 5,427,334 A | 6/1995 | Rauscher, Jr. | |
| 5,901,557 A * | 5/1999 | Grayson | 62/45.1 |
| 6,230,922 B1 | 5/2001 | Rasche et al. | |
| 6,745,983 B2 * | 6/2004 | Taylor | 244/135 R |
| 7,621,291 B2 * | 11/2009 | Behruzi et al. | 137/154 |
| 2004/0055600 A1 | 3/2004 | Izuchukwu | |

FOREIGN PATENT DOCUMENTS

| | | |
|---|---|---|
| DE | 24 58 368 A1 | 6/1975 |
| EP | 0 367 001 A1 | 5/1990 |
| EP | 0753700 A1 | 1/1997 |
| EP | 0 286 392 A2 | 11/2006 |
| FR | 2 744 517 A1 | 8/1997 |
| WO | WO 03/031860 A | 3/2003 |
| WO | WO 2007/004248 A3 | 1/2007 |

* cited by examiner

*Primary Examiner* — Jason M Greene
*Assistant Examiner* — Dung H Bui
(74) *Attorney, Agent, or Firm* — Ladas & Parry, LLP

(57) ABSTRACT

The present invention relates to propellant tanks for space platforms, launchers and every sort of space transport craft.

13 Claims, 9 Drawing Sheets

INTEGRATED PLASTIC LINER FOR PROPELLANT TANKS FOR MICRO G CONDITIONS

Figure 1:
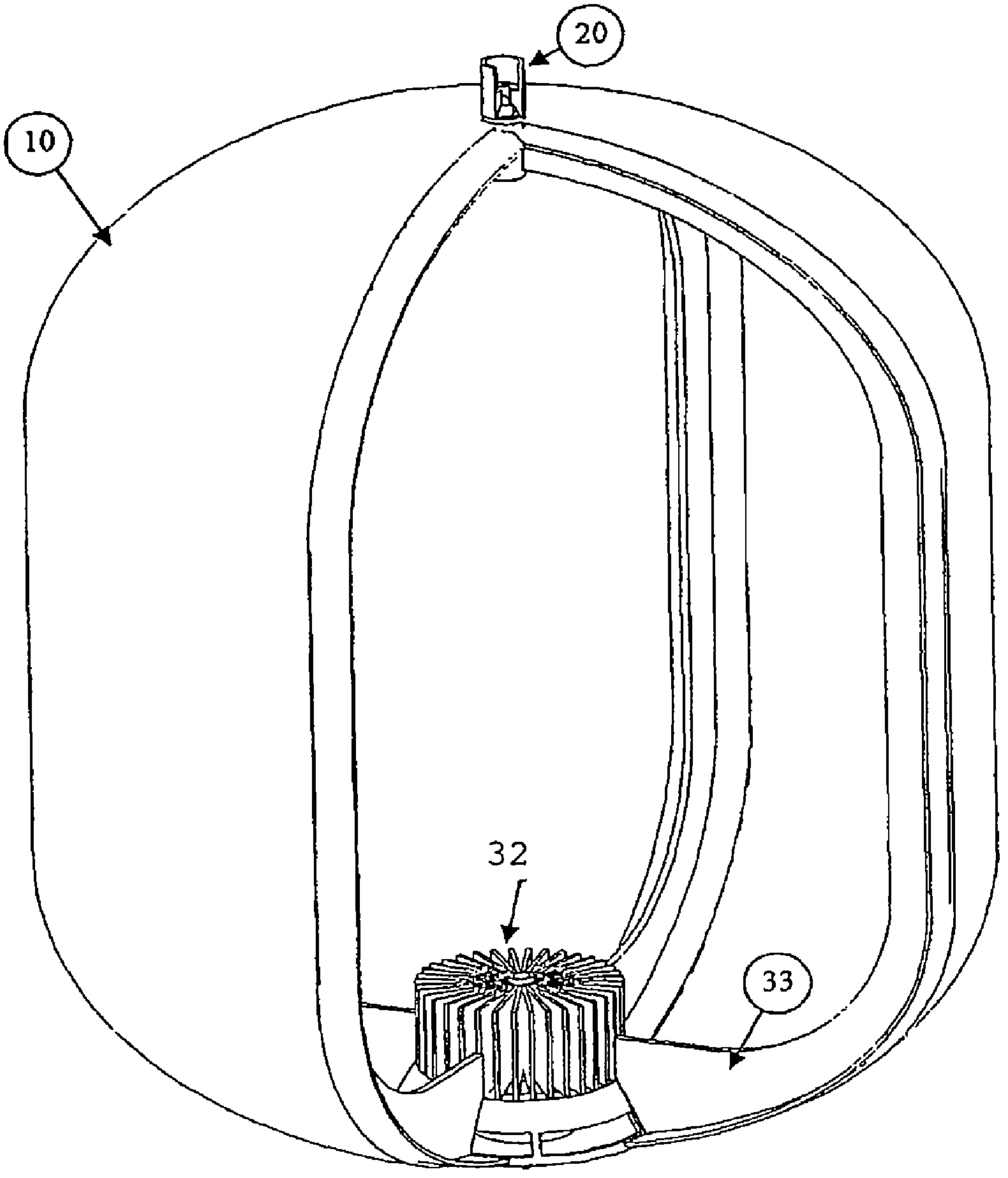

The present invention relates to propellant tanks for space platforms, launchers and every sort of space transport craft.

More specifically, the present invention relates to the need to decrease the launch mass of the space vehicle, to reduce production and development costs and, simultaneously, to reduce the time required for commissioning a tank.

ASSOCIATED TECHNOLOGY

Tanks for transporting propellant are used to store the two components of the hypergolic mixture (fuel and oxidiser), aboard the space vehicle, throughout its operating life.

The constituents of the hypergolic mixture must be fed to the engines at a well defined supply pressure.

This specific function is carried out using pressurising gases, normally inert gases, which thus assure compatibility with the propellant.

To avoid the ingestion of gas bubbles into the engines, which can generate their malfunction, it is necessary to separate the liquid phase of the propellant from the gaseous phase of the pressurising fluid, at the time the propellant is fed into the engine supply lines.

The need to lower costs and to provide ever higher performance, required from new generation space vehicles, both for telecommunication purposes, and for interplanetary exploration missions, lead to specify the use of light-weight components with short development and construction times.

The weight of the propellant tanks varies from a minimum of 25% to 70% of the entire propulsion system, if considered without the propellant itself.

These values support recent efforts by the industry in the development of tanks made of composite materials, which require a liner that is compatible with the propellant, which is then enveloped by carbon fibre, which provides structural strength.

Normally, such liners are made of Titanium and their weight is 30% of the total weight of the tank.

Moreover, the surface tension device for propellant feeding also needs to be integrated with the liner. Said device is also called PMD, or Propellant Management Device.

With said device, with traditional technologies, 40% of the total weight of the tank is covered.

Lastly, recent requirements are for a drastic reduction in the development time of the tanks. This, together with the reduction in development costs, can be obtained by using alternative materials, more rapidly obtained, and innovative designs, which markedly reduce construction and control activities.

These are the novelties introduced by the present invention of the integrated plastic liner, both in terms of the material considered and of the design guidelines.

STATE OF ART

The existing technology proposes liners for tanks for spacecraft, made of Titanium and of plastic material. Both incorporate no device for propellant distribution.

In general, plastic liners, as they have been developed heretofore, have a bare configuration: smooth inner walls, without any device supporting any function whatsoever. These are used only for pressurising gas tanks. Currently propellant distribution devices are integrated with metallic liners, during their assembly. They comprise the following elements: bulkheads; tunnels; traps for liquids; sumps, which are welded to each other and, subsequently, are welded to the liner itself.

In addition to the above, there are other three solutions:

a. Integrated Tankage for Propulsion Vehicles and the Like; methods for integrating structural components within a system of a propulsion vehicle, with a liquid propellant storage system (Zachary R. Taylor). U.S. Pat. No. 6,745,983. The patent refers to the integration between the tank system and the load-bearing structure.
b. Composite Pressurised Container with a Plastic Liner for Storing Gaseous media under Pressure. The patent refers to the combination of a plastic liner and composite structure, where the liner incorporates a valve, whereon the composite fibre is wound. However, this valve is not constructed in integrated fashion, but rather installed subsequently, using a threaded pipe. This invention is used solely for gases, so compatibility with propellants is not considered. (Christian Rasche, Steffen Rau). U.S. Pat. No. 6,230,922. EP 0 753 700.
c. Conserver for Pressurised Gas Tank The application relates to a gas distribution system, where the pressurised tank contracts and expands to perform the gas distribution function itself. The container is composed of a polymeric liner reinforced with high strength fibres. (John I. Izuchukwu). U.S. Pat. No US 2004/0055600.

DESCRIPTION OF THE INVENTION

The apparatus of the present invention was devised as a result of specific requirements, not yet completely solved, aimed at minimising the weights of the propulsion system of a spacecraft.

The Integrated Plastic Liner is made with PTFE, in such a way as to attain the main objective, which is weight reduction and compatibility both with the fuel and with the oxidiser.

The liner is not a structural element, so its thickness can be reduced to a value that is sufficient to perform its containment function over time.

The liner is thus reinforced by means of high strength fibres, e.g. carbon or Kevlar fibres.

The liner typically has cylindrical or spherical shape and it is moulded in two parts: the lower dome and the upper dome.

The lower dome incorporates the components of the propellant distribution device: sump, liquid trap and bulkheads.

Being integrated with the dome, these components are integral parts thereof and manufactured by means of the same moulding equipment.

The sump can be pre-built, depending on the type of configuration, and moulded with the lower dome, in order to obtain a single final component.

The non-return valve, which is a device that prevents the formation of a hypergolic mixture of fuel and oxidiser, is designed and manufactured completely integrated with the upper dome of the liner. This approach is applicable both to the elastic element (spring) and to the sealing element of the valve itself.

To obtain a higher a higher level of redundancy, a second valve can be provided inside a pipe segment, made of the same material, which is integrated on the first, by ultrasonic welding, and subjected to winding, to assure pressure tightness. Greater reliability is thereby obtained with respect to the sealing function of the non-return device.

The two domes, thus obtained, are then integrated together and welded with ultrasonic welding, to prevent any kind of leak to the exterior.

It is therefore an object of the invention a Tank apparatus able to provide compatibility with different types of fluids, able to contain and distribute fluids without gasses included under micro-gravity conditions, to prevent vapours from flowing back upstream and to minimise the global weight of the tank, characterised in that:

a) the containing component of the tank is produced by means of plastic material, compatible with the fluids the tank has to store, by means of a hot forming technique;

b) it internally contains a device for the distribution of the fluid and a device to prevent vapour back-flow, both devices produced, completely or in part, by means of the same plastic material used for said containing component;

c) it is formed by a lower dome made of plastic, which integrates within it said device for the distribution of the fluid without the pressurising gas, to feeding lines by means of elements such as traps, bullheads and sumps; and by an upper dome made of plastic, which integrates within it the device for the prevention of the vapour back-flow; wherein both domes integrate a pipe segment in order to feed the lines with the fluid contained by the tank, and the tank itself with the gas necessary to keep it under pressure.

Fluid is to be intended as fluid or liquid, particularly fluid or liquid propellant.

Preferably the sump element is made of metallic material and subsequently integrated to the trap for fluids, and introduced inside the mould of the lower dome, in such a way as to obtain the fully integrated final component.

Preferably the trap for fluids is further integrated with an additional trap to retain the fluids in gravitational environment and during a horizontal transport of the tank containing the fluids, partly or completely filled.

Preferably the trap for fluids and the bulkheads are provided for the function of dampening the dynamic loads, due to the displacement of the fluids inside the tank, more preferably the material of the containing structure of the liner is flexible, thereby increasing its lightness, having reduced its thickness, by pressurisation during the process of winding with fibres for the reinforcement of the structure.

Preferably the outer surface of the containing structure of the liner is appropriately shaped to generate a correct adhesion of the fibre, during the fibre winding process.

Preferably said non-return device is doubled.

DETAILED DESCRIPTION OF THE INVENTION

Figure 2:
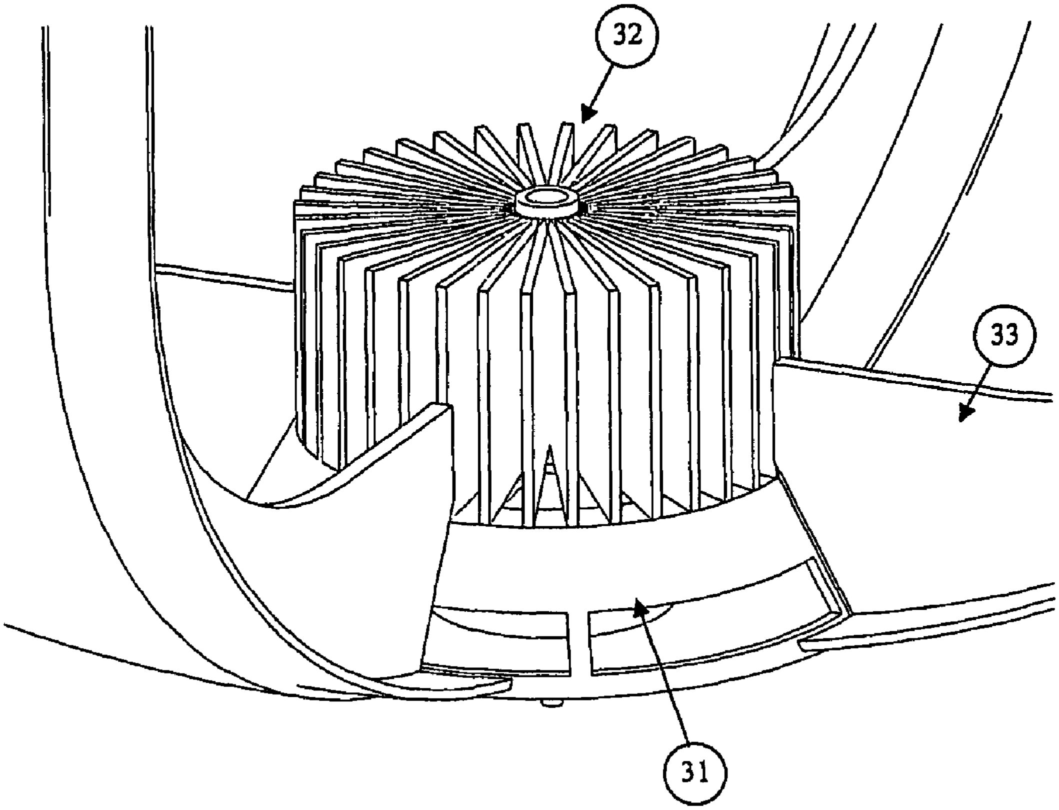

The present invention shall now be described by means of non limiting examples, in reference to the following Figures:

FIG. 1: 3D section of the "Integrated Plastic Liner" assembly, where the configuration of the invention in its integrated form is highlighted FIG. 2: 3D detail of the lower part of the lower dome, where the main components of the propellant distribution device are observed.

Figure 3:
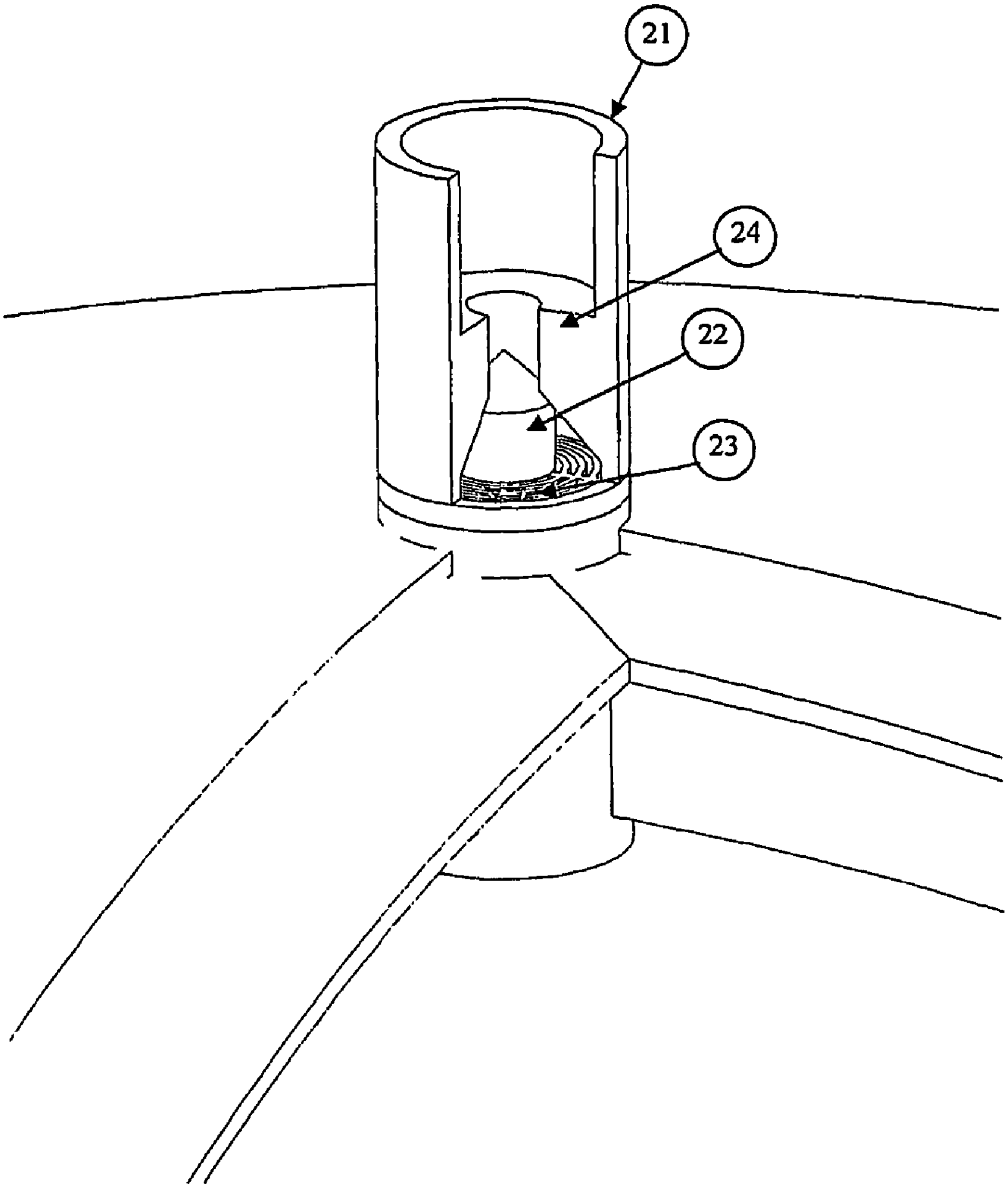
Figure 4:
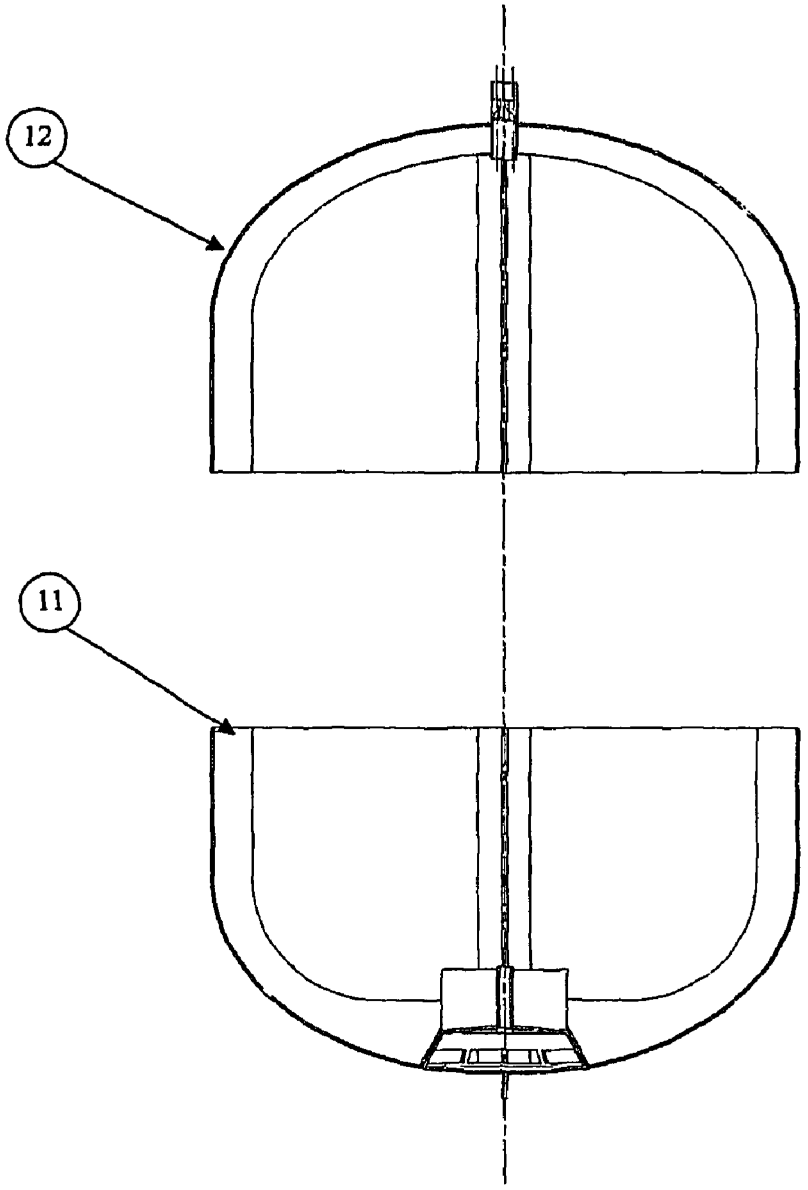

FIG. 3: 3D detail of the upper part of the upper dome, where the non-return valve is observed FIG. 4: section of the two domes as they are extracted from the mould.

Figure 5:
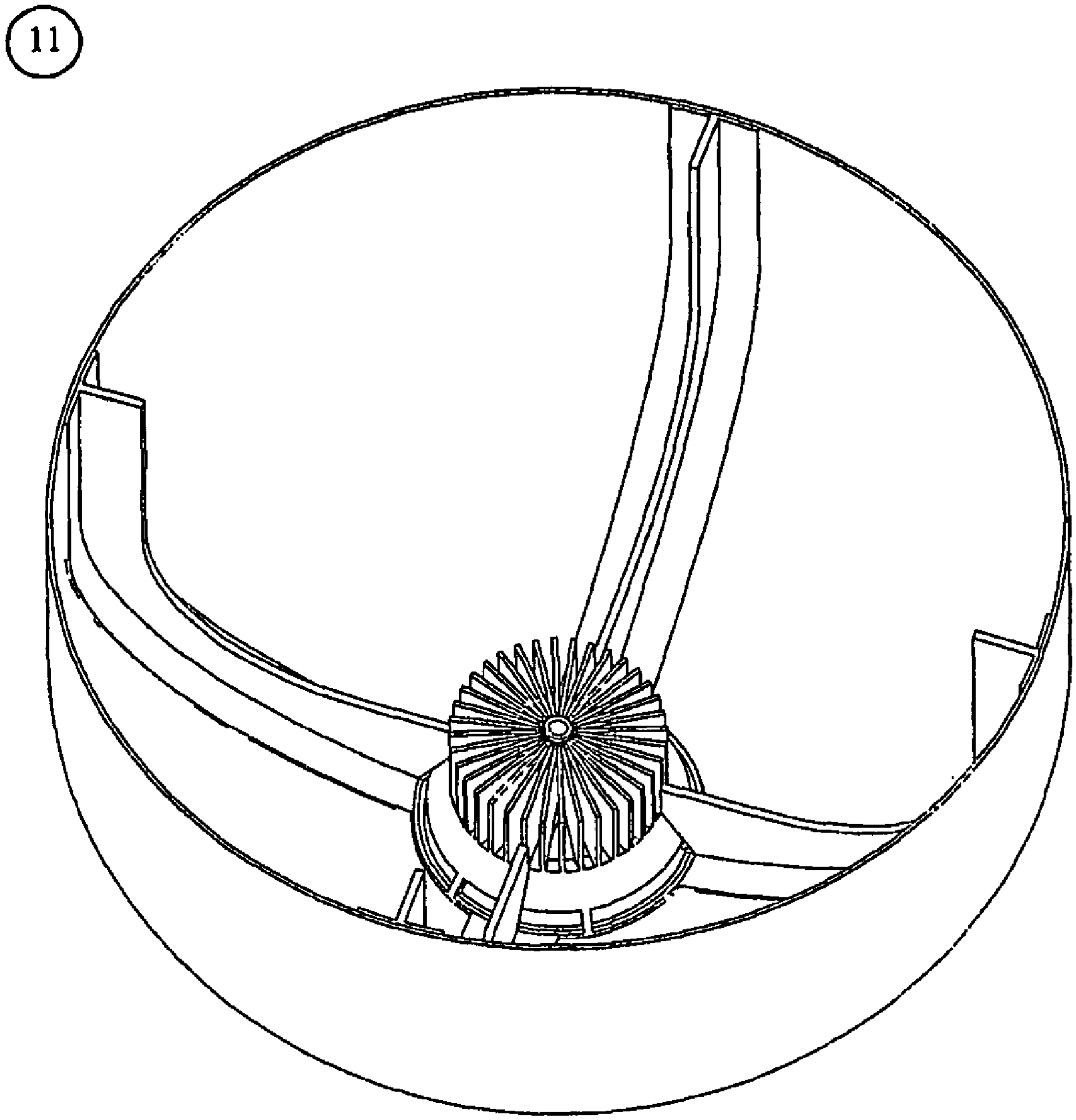

FIG. 5: 3D inner view of the lower dome, where the propellant distribution device is shown, and of the elements that compose it, as they are obtained with the moulding process.

Figure 6:
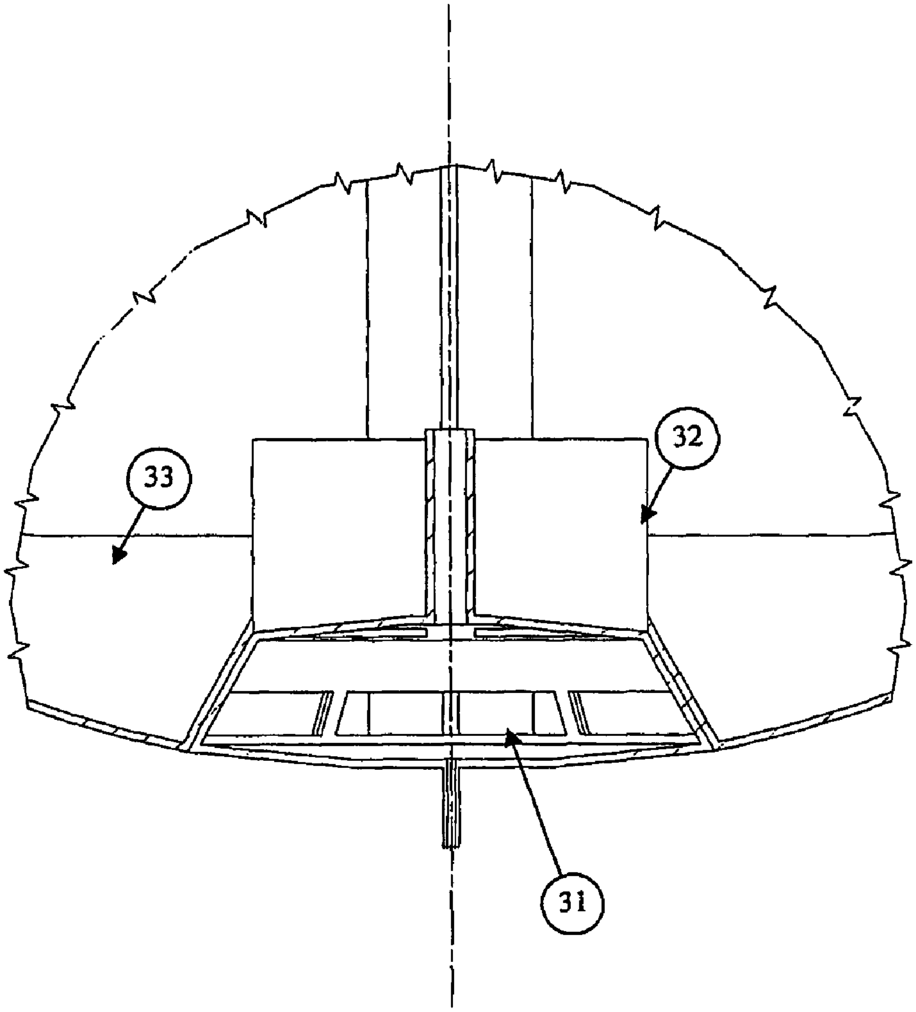

FIG. 6: section of the domes, both lower and upper, illustrating the location of the components of the propellant distribution device.

Figure 7:
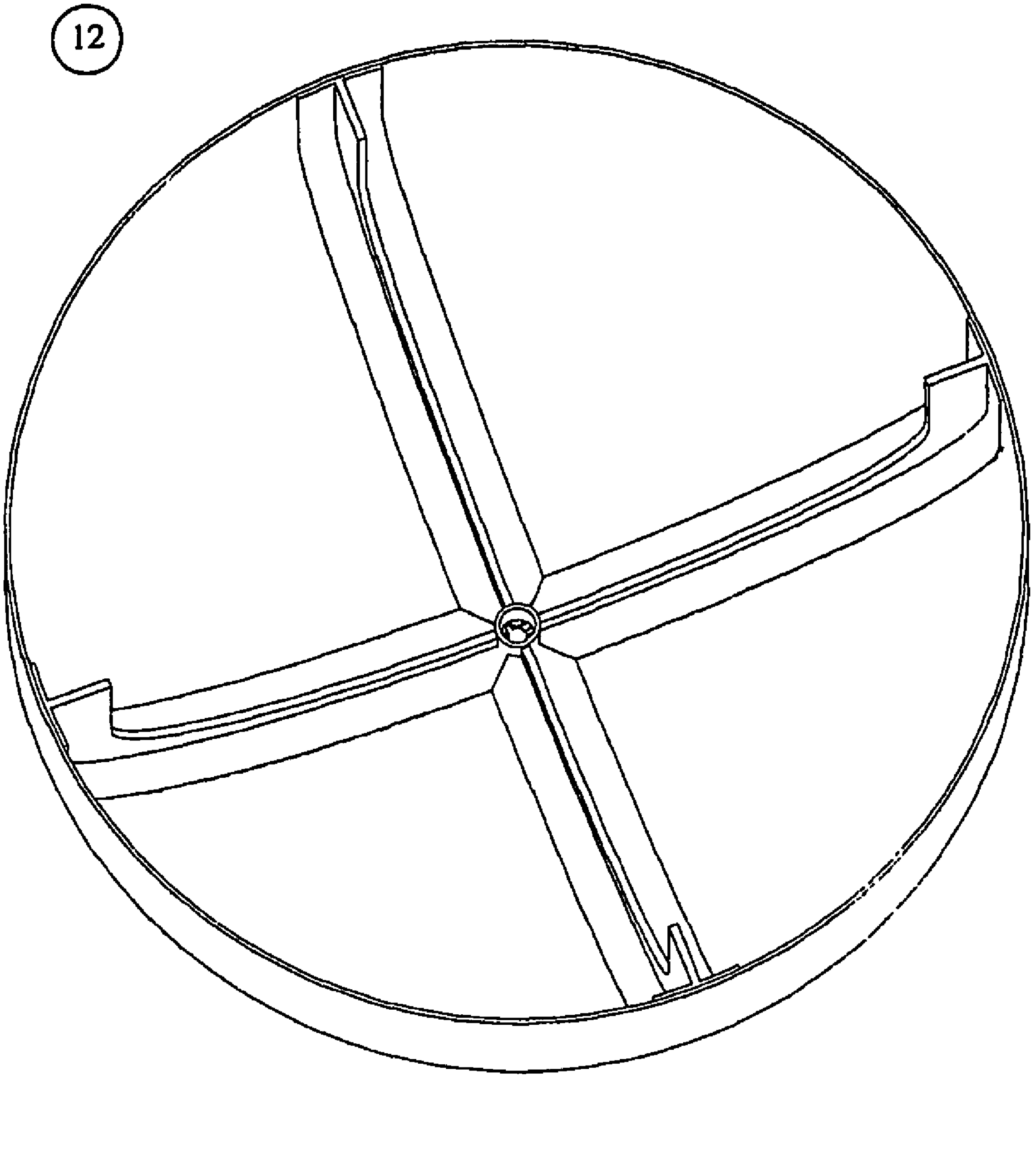

FIG. 7: 3D inner view of the upper dome, showing the configuration of the check valve, as it is obtained with the moulding process.

Figure 8:
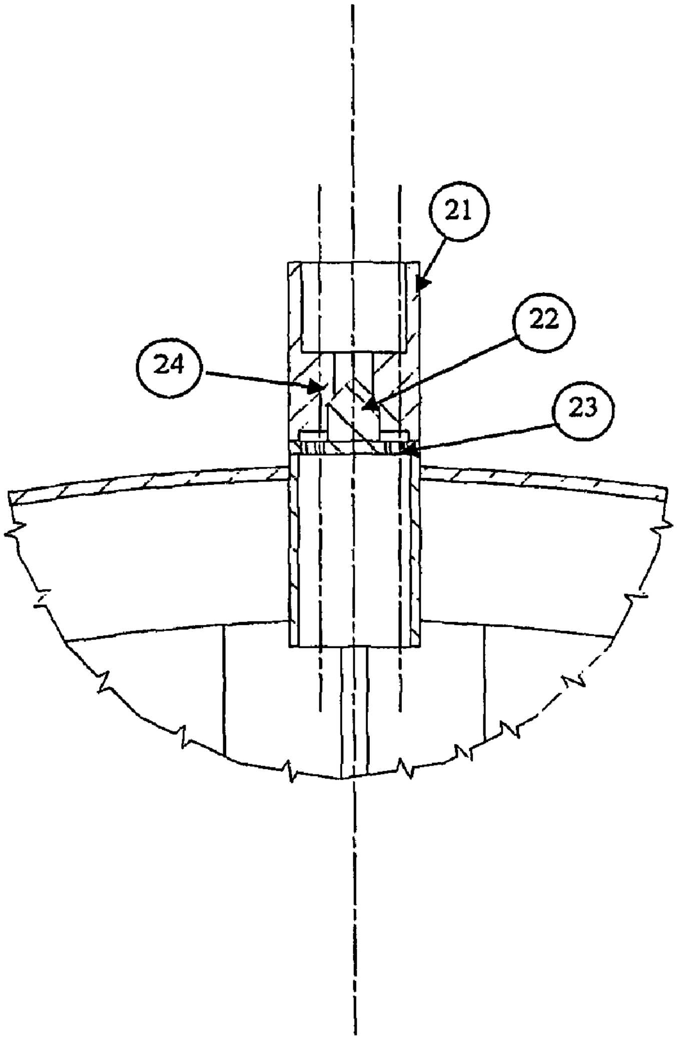

FIG. 8: 8D section illustrating the upper part of the upper dome, where the location of the check valve is visible.

Figure 9:
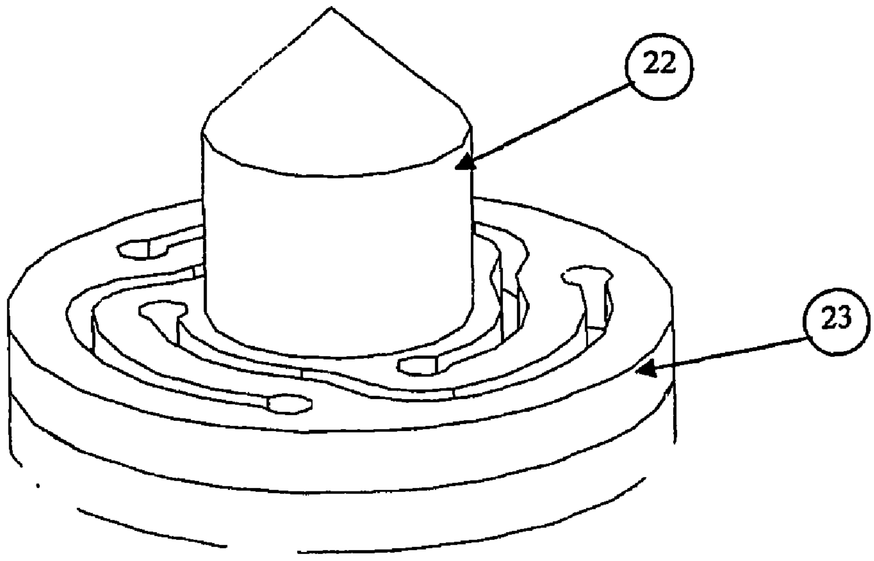

FIG. 9: detailed 3D view of the "S" spring of the non-return valve. Junction element between the pipe segment and the sealing element.

The main characteristics of uniqueness of the invention are highlighted by the details of the drawings. Said details were numbered to facilitate search and comprehension.

The components of the present invention can be dimensioned differently, according to the requirements of the mission and the consequent propellant distribution need.

Therefore, provided that the main guideline of the present invention is the possibility of obtaining the containment structure of the liner and of the device components, both for propellant distribution and for vapour retention, in integrated fashion, by a single moulding operation, the description of the details of the component does not have the intention of limiting the scope of the invention.

The present invention encloses a new liner configuration, a new method for manufacturing and assembling the liner, in such a way as to incorporate three different basic functions for a propellant tank in the same unit:

a. Containment of the fuel and of the oxidiser b. Distribution of the fuel and of the oxidiser without gas inclusions.

c. Retention of the vapours of fuel and oxidiser.

The current technology, the one still in use and overtaken by the present invention, provides for the second and the third function to be carried out by components built separately and assembled with the tank at a subsequent time:

a. The distribution of the fuel and of the oxidiser is accomplished by a dedicated device, which exploits the principle of surface tension, built with a metallic material. In turn, it is normally formed by different components which have to be assembled together before the set is assembled in the tank.

b. The retention of fuel and oxidiser vapours is obtained by the installation of non-return valves, welded to the gas feeding pipeline, upstream of the tank, and formed by metallic elements.

The present invention consists of a design that, together with the fabrication method for moulding, integrates all functions in a single element, obtained by PTFE moulding, compatible both with the fuel and with the oxidiser.

Said element, for the intrinsic characteristics of the moulding process, is manufactured in two halves (see FIGS. 4-11 & 12).

The lower dome (11),as shown by FIGS. 2, 5 and 6, is obtained from a single process whereby, in addition to the structure of the liner, the elements of the propellant distribution device are obtained as well.

⇒Traps (32)

⇒Bulkheads (33)

The Sump (31), depending on the configuration, could be obtained separately and introduced into the mould, to obtain the finished product by co-moulding.

The Sump (31), the trap (32) and the bulkheads (33) have the characteristic of retaining the liquid propellant, during the orbital phases of the mission of the spacecraft, exploiting the surface tension properties of the propellant itself. In this way, once it is filled and wet on the ground, during the filling of the tank, the liquid phase of the propellant is maintained separate from the gaseous phase of the pressuriser.

The elements of the propellant distribution device, as described, are not limited to performing the function of preventing the ingestion of gas in the propellant lines, but they also perform, intrinsically, the function of dampening the forces induced by the dynamics of the propellant inside the tank, during the acceleration phases.

The liquid trap (32) is typically configured with star shape, whose outer radius, depth and number of plates which constitute it, are defined by the propellant distribution requirement (FIGS. 2 and 5).

The present invention is not limited to a few specific missions, but it enables to generate a broad range of different configurations and dimensions.

A similar statement can be made for the bulkheads (33).

Typically, they are equally distributed along the inner walls of the liner, in circumferential fashion.

They can be obtained according to a broad range of different configurations and dimensions.

The lower dome has, in its bottom, a pipe segment which incorporates a metallic cylinder, co-moulded with the plastic dome, which allows to integrate the tank with the propellant feed pipeline. This pipe segment is reinforced, together with the entire structure of the liner, by means of fibres.

The reinforcement is necessary to allow to withstand the pressure levels reached during the working life of the tank.

The same approach is applied to the upper dome (12), as shown in FIGS. 3, 7 and 8.

The upper dome (12), as shown by FIGS. 3, 7 and 8, is obtained from a single process whereby, in addition to the structure of the liner, the elements of the propellant vapour retention device are obtained as well:

The pipe segment (21)
The spring (23)
The valve (22)
The valve seat (24)

The pipe segment is typically cylindrical (21), incorporates the valve seat (24) of the non-return device.

This device serves the purpose of preventing fuel and oxidiser vapours from flowing back, upstream of the respective tanks, which, obviously, to maintain separate the two components of the hypergolic mixture, are two distinct units.

The second half of the check device is formed by the valve (22), which is held in pressure by an S spring (23) against its seat (24).

The S spring also serves the function of physical connection between the valve (22) and the pipe segment (21), which serves as a container of the device itself, as shown by FIG. 9

The two domes (11 & 12), which can have a semi-spherical, cylindrical, elliptical shape or any other axisymmetrical shaped, concur in defining the final configuration, as highlighted by FIG. 4.

The two domes are welded together (10) with the ultrasonic technique, to obtain the definitive configuration (FIG. 1) of the Integrated Plastic Liner.

The need to prevent fuel and oxidiser vapours from flowing back upstream is determined by the need to maintain constant the pressure inside the propellant tanks, by admitting gas from outside the tanks.

Generally, the pressurising gas system simultaneously feeds both the fuel and the oxidiser tank.

These generate vapours which can flow back upstream. Therefore, it is necessary to avoid at all costs any contact between the fuel and the oxidiser and prevent the formation of a hypergolic mixture, when it must not be formed.

The non-return device, as it is conceived, can be made redundant in series, increasing the efficiency of its function.

Redundancy can be obtained by manufacturing, with a dedicated mould, an additional non-return device (20).

A sub-assembly as shown in FIGS. 3 and 8 is thus obtained.

The functions described above, in their integration with the liner, are not limited to use for propulsion systems. More in general, all those hydraulic systems, to be used for space applications or in the absence of gravity, which need a distribution of gas-free liquids and/or the prevention of vapour back-flow, can benefit from the present invention.

One or more elements of the invention can be made of metal and, subsequently, co-moulded with the main structure of the liner (10), in such a way as to be integral parts of the component.

The present invention can be embodied in the most varied forms, and with the most varied materials, without thereby deviating from its constituent and essential characteristics, as claimed below.

Shapes and materials are generally selected according to the needs of the mission for which it is provided and of the liquids it has to transport/store.

The description of the invention must be considered solely by way of illustration and it shall for no reason be seen as restrictive.

Therefore, the scope of the invention shall be construed as indicated by the appended claims, rather than by the preceding description.

Any modification that falls within the scope and a sphere of equivalency with respect to the appended claims shall be considered included within the scope of the claims.

The invention claimed is:

1. Tank apparatus able to provide compatibility with different types of fluids, able to contain and distribute fluids without gasses included under micro-gravity conditions, to prevent vapours from flowing back upstream and to minimise the global weight of the tank, comprising:

- a containing component of the tank produced by means of plastic material, compatible with at least one fluid to be stored in the tank, by means of a hot forming technique;
- a device for distribution of the fluid and a device to prevent vapour back-flow internally contained in the containing component, both of the devices being produced, completely or in part, by means of the same plastic material used for said containing component;
- wherein the containing component is formed by a lower dome made of plastic, which integrates therein said device for the distribution of the fluid without a pressurising gas to a plurality of feeding lines by means of elements including traps, bulkheads and sumps; and by an upper dome made of plastic, which integrates therein the device for the prevention of the vapour back-flow;
- wherein both domes integrate a pipe segment in order to feed the lines with the fluid and a gas necessary to keep the containing component under pressure.

2. Apparatus as claimed in claim 1, wherein the sump element is made of metallic material and subsequently integrated to the trap, and introduced inside a mould of the lower dome, in such a way as to obtain the fully integrated final component.

3. Apparatus as claimed in claim 1, wherein the trap is further integrated with an additional trap to retain the fluid in gravitational environment and during a horizontal transport of the tank containing the fluid, partly or completely filled.

4. Apparatus as claimed in claim 1, wherein the trap and the bulkheads are provided for dampening dynamic loads, due to the displacement of the fluid inside the tank.

5. Apparatus as claimed in claim 1, wherein the material of the containing component is flexible, thereby increasing lightness thereof, reducing thickness thereof, by pressurisation during a process of winding with fibres for the reinforcement of a structure thereof.

6. Apparatus as claimed in claim 1, wherein an outer surface of the containing component of the liner is appropriately shaped to generate a correct adhesion of the fibres, during the fibre winding process.

7. Apparatus as claimed in claim 1, wherein said device for the prevention of the vapour back-flow is doubled.

8. The method of claim 1, further comprising pre-building a metallic sump and co-moulding the upper dome to integrate the pre-built metallic sump with the tank apparatus.

9. An apparatus to contain and distribute fluids in a tank under micro-gravity conditions, comprising:

a lower dome made of a plastic material;

a propellant distribution device made at least in part of the plastic material in the lower dome, the propellant distribution device being operative to maintain a liquid phase of a propellant separate from a gaseous phase of the propellant based on surface tension of the propellant during filling of the tank;

an upper dome made of the plastic material to be sealed with the lower dome; and a device to prevent backflow of vapor in the upper dome.

10. The apparatus of claim 9, wherein the device to prevent backflow of vapor is made of the plastic material.

11. A method of forming a tank apparatus operative to contain and distribute fluids without gasses included under micro-gravity conditions, to prevent vapours from flowing back upstream, and to minimize the global weight of the tank, comprising:

forming a containing component from a plastic material compatible with fluids to be stored therein by a hot forming technique;

internally integrating a device for distribution of the fluids and a device to prevent vapour back-flow in the containing component, wherein the devices for distribution of the fluids and the device to prevent vapour back-flow are formed completely or in part from the plastic material;

wherein the containing component comprises a lower dome made of plastic integrated therein the device for the distribution of the fluid and an upper dome integrated therein the device for the prevention of the vapour back-flow and both the lower and upper domes integrate with a pipe segment.

12. A method for forming a tank apparatus for containing and distributing fluids without gases included under micro-gravity conditions, said tank apparatus comprising a lower dome, a device for distribution of fluid, an upper dome and a device for preventing vapour backflow, wherein said method comprises forming the upper dome, the lower dome, the device for distribution of fluid, and the device for presenting vapour backflow by a single plastic moulding operation.

13. The method of claim 12, further comprising welding the upper dome and the lower dome by ultrasonic welding.

* * * * *